United States Patent
Shen et al.

(10) Patent No.: US 10,191,963 B2
(45) Date of Patent: Jan. 29, 2019

(54) PREFETCHING ANALYTIC RESULTS ACROSS MULTIPLE LEVELS OF DATA

(71) Applicant: Oracle International Corporation, Redwood Shores, CA (US)

(72) Inventors: Xiaolan Shen, San Francisco, CA (US); Sangeeta Dattawadkar, Cupertino, CA (US); Edwin Meijer, Redwood City, CA (US); Aravindan Vijayan, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 338 days.

(21) Appl. No.: 15/057,053

(22) Filed: Feb. 29, 2016

(65) Prior Publication Data
US 2016/0350305 A1    Dec. 1, 2016

Related U.S. Application Data

(60) Provisional application No. 62/245,945, filed on Oct. 23, 2015, provisional application No. 62/168,661, filed on May 29, 2015.

(51) Int. Cl.
*G06F 17/30* (2006.01)

(52) U.S. Cl.
CPC .... *G06F 17/30592* (2013.01); *G06F 17/3048* (2013.01); *G06F 17/30132* (2013.01)

(58) Field of Classification Search
CPC .......... G06F 17/30592; G06F 17/3048; G06F 17/30132
USPC ........................................................ 707/600
See application file for complete search history.

(56) References Cited

U.S. PATENT DOCUMENTS

| | | | | |
|---|---|---|---|---|
| 5,317,727 A | * | 5/1994 | Tsuchida | G06F 17/3048 707/704 |
| 5,544,342 A | * | 8/1996 | Dean | G06F 9/3802 711/119 |
| 6,694,322 B2 | * | 2/2004 | Warren | G06F 17/30457 |

(Continued)

OTHER PUBLICATIONS

Markl et al., "Improving OLAP Performance by Multidimensional Hierarchical Clustering", in Proceedings of International Database Engineering and Applications Symposium (IDEAS' 99), 1999, 13 pages (Year: 1999).*

(Continued)

*Primary Examiner* — Phuong Thao Cao
(74) *Attorney, Agent, or Firm* — Invoke

(57) ABSTRACT

Techniques are described for prefetching analytic results across multiple levels of a dimension in a multidimensional dataset. In some embodiments, an application layer sends a request to view a summary of a multidimensional dataset, where the request targets a first level of a particular dimension of the multidimensional dataset. In response to receiving the request, a pre-fetch range is determined. The pre-fetch range identifies how many levels to analyze along the particular dimension of the multidimensional dataset. At least one analytical operation is performed for the first level of the particular dimension and one or more levels that are within the pre-fetch range of the first level. A first analytic result for the first level is returned to the application layer. For each respective level of the one or more levels within the pre-fetch range, a respective analytic result is stored in a cache.

22 Claims, 5 Drawing Sheets

(56) References Cited

U.S. PATENT DOCUMENTS

| | | | |
|---|---|---|---|
| 6,973,457 B1* | 12/2005 | Bastawala | G06F 17/3041 |
| | | | 707/770 |
| 7,181,450 B2 | 2/2007 | Malloy et al. | |
| 7,366,730 B2 | 4/2008 | Greenfield et al. | |
| 7,792,784 B2 | 9/2010 | Gupta | |
| 7,895,191 B2 | 2/2011 | Colossi et al. | |
| 7,953,694 B2 | 5/2011 | Colossi et al. | |
| 8,001,112 B2 | 8/2011 | Dombroski et al. | |
| 8,209,280 B2 | 6/2012 | Kearney et al. | |
| 8,572,649 B1* | 10/2013 | Gossweiler, III | H04N 21/4532 |
| | | | 725/39 |
| 8,612,421 B2 | 12/2013 | Dombroski et al. | |
| 9,058,357 B1* | 6/2015 | Birnbaum | G06F 17/3048 |
| 9,288,256 B2* | 3/2016 | Goodwin | H04L 67/1095 |
| 9,396,287 B1* | 7/2016 | Bhave | G06F 11/3476 |
| 9,411,853 B1* | 8/2016 | Dovrtel | G06F 17/30592 |
| 9,740,741 B2* | 8/2017 | Plattner | G06F 17/3048 |
| 2002/0029207 A1 | 3/2002 | Bakalash et al. | |
| 2002/0087798 A1* | 7/2002 | Perincherry | G06F 17/3048 |
| | | | 711/133 |
| 2002/0107835 A1* | 8/2002 | Coram | G06F 17/30457 |
| 2002/0126545 A1* | 9/2002 | Warren | G06F 17/30457 |
| | | | 365/200 |
| 2003/0093647 A1* | 5/2003 | Mogi | G06F 17/3048 |
| | | | 712/1 |
| 2004/0139061 A1 | 7/2004 | Colossi et al. | |
| 2004/0215626 A1* | 10/2004 | Colossi | G06F 17/30312 |
| 2004/0236726 A1* | 11/2004 | Ewing | G06F 17/3048 |
| 2005/0157659 A1* | 7/2005 | Huitema | H04L 67/104 |
| | | | 370/254 |
| 2006/0230024 A1* | 10/2006 | Lei | G06F 17/3048 |
| 2006/0271507 A1 | 11/2006 | Anzalone et al. | |
| 2008/0270449 A1* | 10/2008 | Gossweiler | G06F 17/30817 |
| 2008/0271080 A1* | 10/2008 | Gossweiler | G06F 3/0486 |
| | | | 725/47 |
| 2011/0320415 A1* | 12/2011 | Berger | G06F 17/3048 |
| | | | 707/692 |
| 2012/0162265 A1* | 6/2012 | Heinrich | G06Q 10/06393 |
| | | | 345/661 |
| 2012/0166384 A1* | 6/2012 | Nos | G06F 17/30539 |
| | | | 707/602 |
| 2013/0031204 A1* | 1/2013 | Graham | H04L 67/2847 |
| | | | 709/217 |
| 2013/0080388 A1* | 3/2013 | Dwyer | G06F 17/3048 |
| | | | 707/634 |
| 2013/0132967 A1* | 5/2013 | Soundararajan | G06F 9/5066 |
| | | | 718/104 |
| 2013/0191523 A1* | 7/2013 | Buck | G06F 9/5066 |
| | | | 709/223 |
| 2014/0052956 A1* | 2/2014 | Moll | G06F 12/1036 |
| | | | 711/205 |
| 2014/0289183 A1* | 9/2014 | Dipper | G06F 17/30592 |
| | | | 707/602 |
| 2014/0310232 A1* | 10/2014 | Plattner | G06F 17/3048 |
| | | | 707/602 |
| 2015/0212943 A1* | 7/2015 | Yang | G06F 12/0862 |
| | | | 711/137 |
| 2015/0378920 A1* | 12/2015 | Gierach | G06F 12/0862 |
| | | | 711/118 |
| 2015/0379957 A1* | 12/2015 | Roegelein | G09G 5/005 |
| | | | 345/667 |
| 2016/0132790 A1* | 5/2016 | Weissman | G06Q 10/02 |
| | | | 705/5 |
| 2016/0350305 A1* | 12/2016 | Shen | G06F 17/30592 |
| 2016/0350393 A1* | 12/2016 | Zheng | G06F 17/30592 |

OTHER PUBLICATIONS

Rhodes et al., "Iteration Aware Prefetching for Large Multidimensional Scientific Datasets", in Proceedings of the 17th International Conference on Scientific and Statistical Database Managements, 2005, 10 pages. (Year: 2005).*

* cited by examiner

PREFETCHING ANALYTIC RESULTS ACROSS MULTIPLE LEVELS OF DATA

CROSS-REFERENCE TO RELATED APPLICATIONS; BENEFIT CLAIM

This application claims the benefit of Provisional Appln. 62/245,945, filed Oct. 23, 2015, the entire contents of which are hereby incorporated by reference as if fully set forth herein, under 35 U.S.C. § 119(e). This application also claims the benefit of Provisional Appln. 62/168,661, filed May 29, 2015, the entire contents of which are hereby incorporated by reference as if fully set forth herein, under 35 U.S.C. § 119(e).

This application is related to application Ser. No. 15/057,056, entitled "INHERITED DIMENSIONS", filed Feb 29, 2016, the entire contents of which are hereby incorporated by reference as if fully set forth herein.

FIELD OF THE DISCLOSURE

The present disclosure generally relates to online analytical processing (OLAP) and, more particularly, to systems, technical steps, and stored instructions for fetching, processing, and modelling data in multidimensional datasets.

BACKGROUND

Database systems are often designed to maintain a relatively large amount of information about a variety of entities, events, or occurrences (referred to generally as occurrences), and these occurrences may be described by a variety of characteristics. Even database systems that do not yet contain large amounts of information are often designed to be scalable such that the database systems can be adapted to accommodate ever-increasing amounts of data. Some tables are so large, due to the fact that they include every occurrence and every characteristic of every occurrence, that they may be impossible to analyze if there are not enough resources to store and process significant portions of these tables. Even if sufficient resources are available, storing and processing significant portions of these large tables can be quite costly. As a result, when occurrences have many characteristics or are otherwise related to a variety of information, many database systems separate such information about the occurrences into multiple tables.

Database systems often group tables based on categories of characteristics. Much of the information may be descriptive information about entities, categories, or classes of information (referred to generally as categories) involved in the occurrences. The description of these underlying categories may change infrequently compared to the other tables that record or measure the occurrences themselves. Dimension tables are tables that contain descriptive information about occurrences that are referenced by or may be referenced by other table(s). The other table(s) include column(s) that reference row(s) of the dimension table(s), and each referencing column identifies what is referred to as a dimension of column(s) that occur in dimension table(s). Data that is organized into two or more dimensions is referred to herein as a multidimensional dataset.

Fact tables are the other tables that measure the occurrences related to the categories. In other words, fact tables store facts or measurable quantitative data, and this measurable data may be involved with or otherwise fall under the categories. By referencing the dimension tables, the fact tables do not need to duplicate all of the information contained in the dimension tables. Generally, because fact tables may include multiple occurrence(s) that reference the same category, fact tables are usually larger than dimension tables. Also, because fact tables measure the occurrences rather than recording the definitions, the fact tables are usually updated more frequently than dimension tables. An organization of multidimensional data into fact table(s) and dimension table(s) is referred to as a star schema.

Queries that operate on data stored in tables that belong to a star schema are referred to as star queries. Star queries often request information from a fact table with filters that are based on characteristics listed in the dimension tables. For example, a star query may request all sales records that involved customers between the ages of 25 and 30. Although the fact table may include all sales records and identify the customers involved in those sales, the fact table likely does not list the respective ages of those customers. Therefore, evaluation of the star query requires a determination of which fact table records identify customers that fall within the requested ages. Such a determination may consume significant amounts of resources for large fact tables and multiple filters.

Some analytical applications initially present an aggregated view of multidimensional data at a particular level. In order to generate the view, an underlying OLAP system typically scans one or more fact tables, which may comprise several million records, to return few rows of data. A request to drill down to a different aggregated view of the multidimensional dataset may trigger a subsequent scan of one or more relatively large tables, which may be computationally expensive. One approach to preserve compute-resources during run-time is to pre-compute aggregated views. The number of possible aggregations, however, may be prohibitively large to continuously calculate and update due to the large possible combinations of dimension granularities. Therefore, this approach may not be feasible where the multidimensional datasets include large amounts of data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

General Overview

In various embodiments, computer systems, stored instructions, and technical steps are described for analyzing multidimensional datasets. Some embodiments include pre-fetching analytic results across multiple levels of a dimension in a multidimensional dataset. When an application layer sends a request to view a summary of a multidimensional dataset, where the request targets a first level of a particular dimension of the multidimensional dataset, a query engine or other service determines a pre-fetch range. The pre-fetch range identifies how many levels to analyze along the particular dimension of the multidimensional dataset. At least one analytical operation is performed for the first level of the particular dimension and one or more levels that are within the pre-fetch range of the first level. A first analytic result for the first level is returned to the application layer. For each respective level of the one or more levels within the pre-fetch range, a respective analytic result is stored in a cache even though the respective analytic results is not required as a result to the query or to view the summary requested by the query. By pre-fetching analytical results, information for layers that were not initially queried may be provided anyway.

In some embodiments, pre-fetching is extended to top-n analytics of multidimensional datasets. When a request is received to retrieve, for a multidimensional dataset, a ranked set of data items that are associated with a first key attribute, a query engine ranks, for the first level, a first set of data items that are associated with a first key attribute that is associated with a first level in a multilevel hierarchy for a particular dimension of the multidimensional dataset. A second key attribute is identified that is at a second level in the multilevel hierarchy for the particular dimension of the multidimensional dataset. The query engine ranks, for the second level, a second set of data items that are associated with the second key attribute. A first result set that identifies the first set of data items is returned, and a second result set that identifies the second set of data items is cached.

Analytics Cloud Services for Managed Targets

Figure 1:
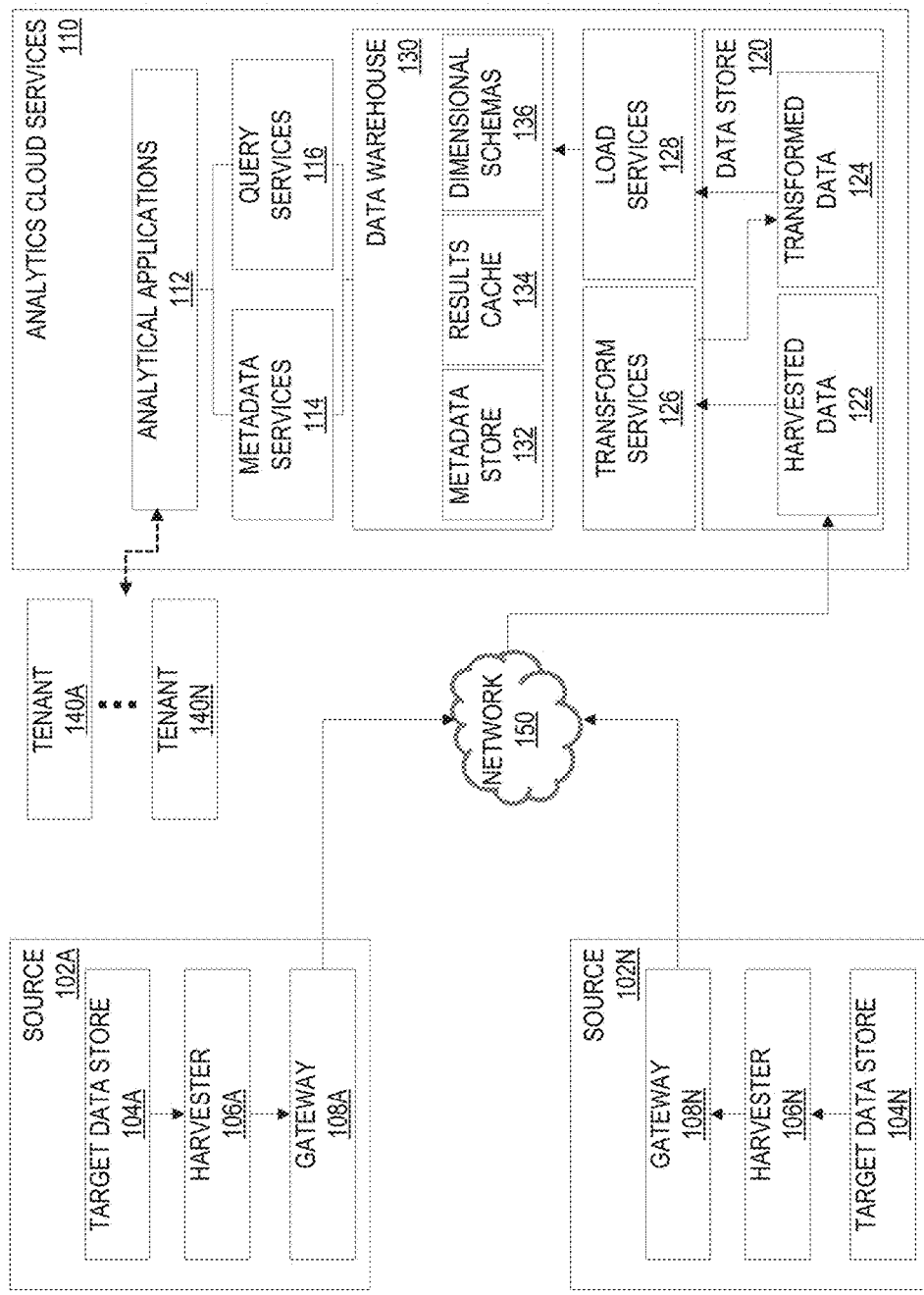
FIG. 1 depicts an example system for providing analytic cloud services for managed targets that are associated with one or more tenants.

FIG. 1 illustrates an example system for providing analytic cloud services for managed targets that are associated with one or more tenants. The system generally comprises sources 102a to 102n, network 150, and analytics cloud services 110. Tenants 140a to 140n may access analytics cloud services 110 using applications that are connected to analytic cloud services 110 through network 150. In some embodiments, the applications may comprise web browsers or rich Internet applications (RIA) that interact with analytical applications 112. In other embodiments, a tenant may use an analytic application that interacts directly with metadata services 114 and query services 116, thereby bypassing analytic applications 112 that reside in the cloud.

Sources 102A to 102N represent one or more sources from which managed target data is collected. In some embodiments, sources 102A to 102N may correspond to different tenant sites, such as datacenters or other data warehouses, where the managed targets reside on premise in relation to a corresponding tenant. In addition or alternatively, one or more of sources 102A to 102N may correspond to other cloud services that are consumed by one or more of tenants 140A to 140N. As an example, a source may be a database cloud service or some other software-as-a-service (SaaS) that includes target data that a tenant would like to load into analytics cloud services 110.

Source 102A includes target data store 104A, harvester 106A, and gateway 108A, and source 102N includes target data store 104N, harvester 106N, and gateway 108N. Harvesters 106A and 106N extract target data from the respective target data stores. As an example, target data stores may store a set of target attributes that describe or other identify characteristics of a target. A "target" in this context refers to a managed object or entity. Examples may include, without limitation, host machines, software deployments, data structures that represent physical objects, or some combination thereof. Gateways 108A and 108N send the target data through network 150 to analytics cloud services 110. Network 150 represents one or more data communication networks, such as the Internet. The gateways may communicate with analytics cloud services 110 using a set of one or more communication protocols, such as protocols of the internet protocol (IP) suite. Gateways 108A and 108N may send extracted target data on a continuous basis, a periodic basis, or on demand depending on the particular implementation.

The target data that is extracted by a harvester and send to analytics cloud services 110 may vary from implementation to implementation. In some embodiments, the extracted data comprises one or more of the following:

Metric Data: Metric data identifies a set of measurable attributes. Example metric data may include performance measures that quantify the performance of a respective target or descriptive measures that quantify the features of a target;

Event Data: Event data identifies the occurrence of one or more events. Example event data may include availability information that identifies the availability and downtime of a target system and transaction data that identifies a sale or other transaction; and Configuration Data: Configuration data identifies settings or other arrangements of a target. In the context of software resources, for example, the configuration data may identify patches that have been applied, security settings, network configurations, etc.

Analytics cloud services 110 includes data store 120, transform services 126, and load services 128. Data store 120 stores harvested data 122 and transformed data 124. Harvested data 122 comprises data received from gateways 108A and 108N in a first format. The organization and format of harvested data 122 may vary from implementation to implementation. Examples may include extensible markup language (XML) files, flat files, and database datafiles. Transform services 126 performs a set of one or more functions to transform harvested data 122 into transformed data 124. Example transformations may include cleansing, aggregating, and integrating data from one or more sources. Load services 128 loads transformed data 124 into data warehouse 130. For example, load services 128 may load dimensional data, measure data, and metadata for a set of OLAP cubes.

Data warehouse 130 includes metadata store 132, results cache 134, and dimensional schemas 136. Metadata store 132 stores metadata that defines or otherwise describes attributes associated with a multidimensional datasets. As an example, for a particular cube, the metadata may identify a cube name, associated facts, and associated dimensions. For a particular dimension, the metadata may identify a dimension name, associated dimension attributes, and associated dimension hierarchies. The metadata may further define subjects, where a subject is a collection of related cubes. The subject metadata may identify a subject name and which cubes belong to the subject.

Results cache 134 stores query results, including pre-fetched result data. Results cache 134 may further store database queries generated in response to requests from particular applications, as described further herein.

Dimensional schemas 136 organize and store data based on dimensions. As an example, dimensional schemas 136 may store star schemas where data is loaded into dimension tables and fact tables. The star schemas correspond to multidimensional datasets that are defined by the metadata in metadata store 132.

Analytical Application Framework

Analytics cloud services 110 may provide a framework through which analytical applications are generated and published. For example, analytical applications 112 may be generated by tenants, a cloud administrator, and/or third-party developers. Once designed, analytical applications 112 may be published by analytics cloud services 110 to one or more of tenants 140A to 140N. Different tenants may subscribe to an analytical application, allowing users to analyze data without the complexity of designing custom and potentially complex analytical queries.

The analytical applications that are designed and published may be varied in nature depending on the particular implementation. An analytical application may provide dashboards, charts, graphs, reports, and/or other graphical user interface (GUI) objects through which tenants can view summaries of different levels of data. A "level of data" in this context refers to a combination of dimension levels for which an aggregation or other analytical operation is possible. As an example, in a three dimensional multidimensional dataset, one level of data may correspond to the combination of "Year" on the time dimension "Country" for a location dimension and "Product Category" for a product dimension. A different level of data corresponds to each possible combination of attributes. Thus, by changing "Year" to "Month", "Country" to "State", and/or "Product Category" to "Electronics", the user navigates to a different level of data. The GUI objects of an analytical application may allow a user to drill-down or up to navigate different levels of data within one or more multidimensional datasets. The GUI objects may further allow slicing, dicing, roll-ups, and pivoting to generate different summary views of the data.

Analytical applications 112 may support different types of summary views of the multidimensional dataset. Different summary views may be associated with different analytical operations. For instance, one summary may provide a view of aggregated sales totals for the level of data currently being viewed by the user. Another summary may provide a view of average sales amount for the level of data being viewed. A summary view may also provide a view of a combination of such analytical operations (e.g., both total and average sales). In some embodiments, the analytic operation aggregate values based on an analytic function. Example analytical functions may include functions for computing maximums, minimums sums, averages, custom formulas, ranks, regressions, and window functions. In addition or alternatively, an analytic operation may perform costing, trending or forecasting based on aggregated values. As an example, fourth quarter sales may be forecast based on fourth quarter sales for one or more previous years.

In some embodiments, analytics cloud services 110 supports a high-level query language that decouples the application layer from the underlying physical implementation of data warehouse 130. Using the high-level query language, developers may design analytical applications without explicitly incorporating structured query language (SQL) statements that reference specific physical database objects. Developers instead may use query descriptors, which are translated into SQL queries by query services 116.

In some embodiments, query descriptors define or otherwise identify analytical operations to perform. For example, one query descriptor may be associated with performing a trending analysis. Another may be generated to performing a costing analysis. The query descriptor may identify, at a high level, the measures to use in performing the analytical operation, the dimensions that are relevant to the analytical operation, and hierarchy information for performing the analysis. TABLE 1 below includes an example query descriptor for analyzing average CPU usage of targets.

TABLE 1

SAMPLE QUERY DESCRIPTOR WITH ROLLUP

```
Query Descriptor 1:
{
    "subject":"SUBJECT1",
    "cube":"LOADCUBE",
    "source":{
        "type":"cube",
        "cube":"LOADCUBE"
    },
    "aggregationList":[
        {
            "type":"measureAggregation",
            "function":"Average",
            "functionParameters":[
            ],
            "measure":"CPU LOAD"
        },
        {
            "type":"aggregationAggregation",
            "function":"Trunc with format",
            "alias":"time_nk",
            "functionParameters":[      "'hh'"     ],
            "treatAsMeasure":false,
            "aggregation":{
                "type":"dateAggregation",
                "function":"Minimum",
                "functionParameters":[
                ],
                "cube":"LOADCUBE",
                "dimension":" TIME"
            }
        }
    ],
    "selectionList":[
    ],
    "grpbyEntityList":[
        {
            "type":"grpbyLevel",
            "withRollup":false,
            "level":{
                "name":"TIMELEVELMONTHOFYEAR",
                "hierarchy":"TIMEHIERBYMONTHOFYEAR",
                "dimension":" TIME"
            },
            "attrSelList":[
                {
                    "type":"attributeSelection",
                    "attribute":{
                        "name":"MONTHOFYEAR",
                        "dimension":" TIME"
                    }
                }
```

TABLE 1-continued

SAMPLE QUERY DESCRIPTOR WITH ROLLUP

```
            }
         ]
      }
   ],
   "rollupLowestLevels":[
      {
         "name":"TARGETLEVELINSTANCE",
         "hierarchy":"TARGETHIERBYLIFECYCLESTATUS",
         "dimension":"TARGET"
      }
   ],
   "startingRollupLevels":[
      {
         "name":"TARGETLEVELLIFECYCLESTATUS",
         "hierarchy":"TARGETHIERBYLIFECYCLESTATUS",
         "dimension":"TARGET"
      }
   ],
   "whereExpression":{
      "conjunction":"AND",
      "filterList":[
         {
            "type":"relative_time_range",
            "offset":1,
            "dimension":"TIME",
            "timeZone":"America/Boise",
            "offsetField":1
         }
      ]
   },
   "parameters":{
   },
   "dynHierList":[
   ],
   "hasDynHier":false
}
```

The query descriptor indicates the analytical operations to perform ("Average", "Minimum"), the relevant dataset ("cube": "LOADCUBE"), the relevant measure ("CPU LOAD"), the relevant dimensions ("TIME", "TARGET"), the target level of data and dimension levels ("TIMELEVELMONTHOFYEAR"), the level of depth for the analytical operation ("rollupLowestLevels", "startingRollupLevels") and filters ("filterList"). The above example query descriptor is given for purposes of illustration. Query descriptors may be generated for other analytical operations that target the same or different multidimensional datasets. The format and contents of a query descriptor may vary from implementation to implementation.

Upon receiving a query descriptor, query services 116 may generate a database query comprising one or more SQL statements to target the underlying physical database objects. For example, query services 116 may translate query descriptor descriptions using metadata from metadata store 132. Translation involves mapping the expressions to target the corresponding tables and columns to produce a set of one or more analytical results.

A query descriptor may be attached to one or more analytical applications. For example, the query descriptor in Table 1 may be stored in association with an analytic application for analyzing performance characteristics of target characteristics. When a tenant accesses the application, the query may be executed to generate a corresponding summary presentation. The summary presentation may initially present a view at a target level and then allow the user to drill through to other levels. The GUI objects, such as bar charts, line charts, graphs, cubes, etc., are updated to display the currently selected level of data as the user navigates through the summary views provided by the analytical application.

Metadata services 114 may provide metadata information to an application or other user upon request. The metadata information may be used to generate and modify query descriptors that target certain subjects, cubes, dimensions, and dimension hierarchies. TABLE 2 below identifies an example metadata request.

TABLE 2

SAMPLE METADATA REQUEST method = GET
http(s)://{host}:{port}/.../warehouse/metadata/subjects The metadata request of TABLE 2 is implemented using the Hypertext Transfer Protocol (HTTP) and may be submitted by the tenant through a browser or other application through network 150. The metadata request fetches subject metadata for the tenant's data at the identified path. TABLE 3 below includes a sample response.

TABLE 3

SAMPLE METADATA

```
{
   name: "TVMDWFSUBJECT"
   displayName: "TvmdwfSubject"
   description: "TvmdwfSubjectDescription"
   cubes: [2]
      0:
      {
         name: "TVMDWFACCURACYTEST"
         subjectName: "TVMDWFSUBJECT"
         cubeName: "TVMDWFACCURACYTEST"
         displayName: "TvmdwfAccuracyTest"
         description: "TvmdwfAccuracyTest"
         metricGroup: null
         targetType: null
         cubeType: 2
         status: 1
         createdTime: "2015-05-19T21:54:31"
         updatedTime: "2015-05-19T21:54:31"
         earliestTime: "2014-05-19T00:00:00"
         latestTime: "2015-06-17T23:50:00"
      }
      1:
      {
         name: "TVMDWFDISKACTIVITY"
         subjectName: "TVMDWFSUBJECT"
         cubeName: "TVMDWFDISKACTIVITY"
         displayName: "TvmdwfDiskActivity"
         description: "TvmdwfDiskActivityDescription"
         metricGroup: null
         targetType: null
         cubeType: 2
         status: 1
         createdTime: "2015-05-19T21:54:31"
         updatedTime: "2015-05-19T21:54:31"
         earliestTime: "2013-05-19T00:00:00"
         latestTime: "2015-06-17T23:00:00"
      }
}
```

The sample metadata response identifies characteristics of a subject, including the name of the subject, the cubes that belong to the subject, and characteristics of the cubes that belong to the subjects. The sample metadata response may identify other cubes and subjects that are not illustrated for purposes of brevity. A user may incorporate the metadata information, such the name of a subject or a particular cube, into query descriptors for a particular analytical operation, to target certain multidimensional datasets for analysis.

Analytic Result Caching for Different Levels of Data

In some embodiments, analytics cloud services 110 supports analytic result caching for different levels of data. When an analytical application requests a summary view, a particular level of data may be targeted for display. In response to the request, query services 116 generates a query to perform an analytical operation on a slice of data at the targeted level. The generated query may also perform the analytical operation for one or more other slices of data to pre-compute and pre-fetch analytical results for one or more additional levels of data. Query services 116 returns the analytic results for the targeted level for display by the analytical application's GUI. Query services 116 may also store the analytic results for the targeted level and the one or more additional levels of data in results cache 134. If the user navigates to a different level of data, the analytic application may request analytic results for the corresponding slice of data. In response, query services 116 may fetch the corresponding analytic results from results cache 134.

In some cases, the number of possible analytic results that may be pre-fetched may be prohibitively large due to the number of possible dimension attribute combinations. In order to restrict the number of analytic results that are precomputed and cached, a pre-fetch range may be defined. Analytic results for levels of data within the pre-fetch range may be pre-fetched and cached, whereas analytic results for levels of data outside the pre-fetch range are not pre-fetched and cached. The pre-fetch range may be selected based on the levels of data that are most likely to be analyzed. The pre-fetch range may vary from application to application, and may be specified in a query descriptor.

In some embodiments, the pre-fetch range is defined in relation to the hierarchical dimension levels associated with a particular dimension. By associating the pre-fetch range with a particular dimension, pre-fetching of analytic results may be restricted to a particular drill through path. As an example, there may be multiple possible drill through paths for a particular level of data that is being currently viewed. If the user is viewing the sales of a particular product categorized by month and state, a user may drill down and/or drill up along different dimensions such as the product dimension, the time dimension, and the state dimension. The pre-fetch range may be associated with the time dimension but not the product or location dimension to restrict pre-fetching to levels that are along a drill-through path on the time dimension. Thus, if the user drills up from month to year or drills down from month to day, the analytic results for the next level are cached. If, however, the user drills through from state to city, then the results are not cached, and a new query is executed to compute the analytic result. The new query may pre-fetch analytic results along the time dimension as well. In another example, the pre-fetch range may be associated with the location dimension rather than the time dimension. Thus, as the user drills up (e.g., state to country) or drills down (e.g., state to region), the analytic results may be fetched from the cache. Drill through operations along the time dimension results in new queries against the multidimensional dataset.

In some embodiments, the pre-fetch range defines how deep within a dimension hierarchy to pre-fetch results. The pre-fetch range may specify the range as a positive integer identifying the number of levels along a drill through path for which analytic results are pre-fetched. The pre-fetch range may apply to drill-downs, drill-ups, or to both depending on the particular implementation. For example, if the pre-fetch range is two along the time dimension, then analytic results may pre-fetched for the next two levels that are below and/or above the currently viewed level in the dimension hierarchy.

In some embodiments, a pre-fetch range may be associated with multiple dimensions. For example, a pre-fetch range in the example above may be associated with both the time and location dimensions. This association results in caching along multiple drill through paths. In order to pre-fetch the analytical results, aggregations may be performed for different combinations of the dimension levels. The number of levels for the different dimensions may be the same, or a separate range may be associated with each one.

In some embodiments, the pre-fetch range is defined based on predictive analytics that attempt to anticipate pre-fetch levels of data beyond those required to satisfy an initial query. For example, current and historical data may be analyzed to determine which dimensions, drill through paths, and levels users are most likely to navigate. Based on the analysis, a likelihood that a user will navigate to a particular level of a drill through path when viewing a summary at a different level may be determined. If the likelihood satisfies a threshold, the pre-fetch range may be associated with the corresponding dimension, drill-through path, and level. Each analytical application may determine which analytic results to pre-compute and pre-fetch based on their own predicted usage patterns.

Figure 2:
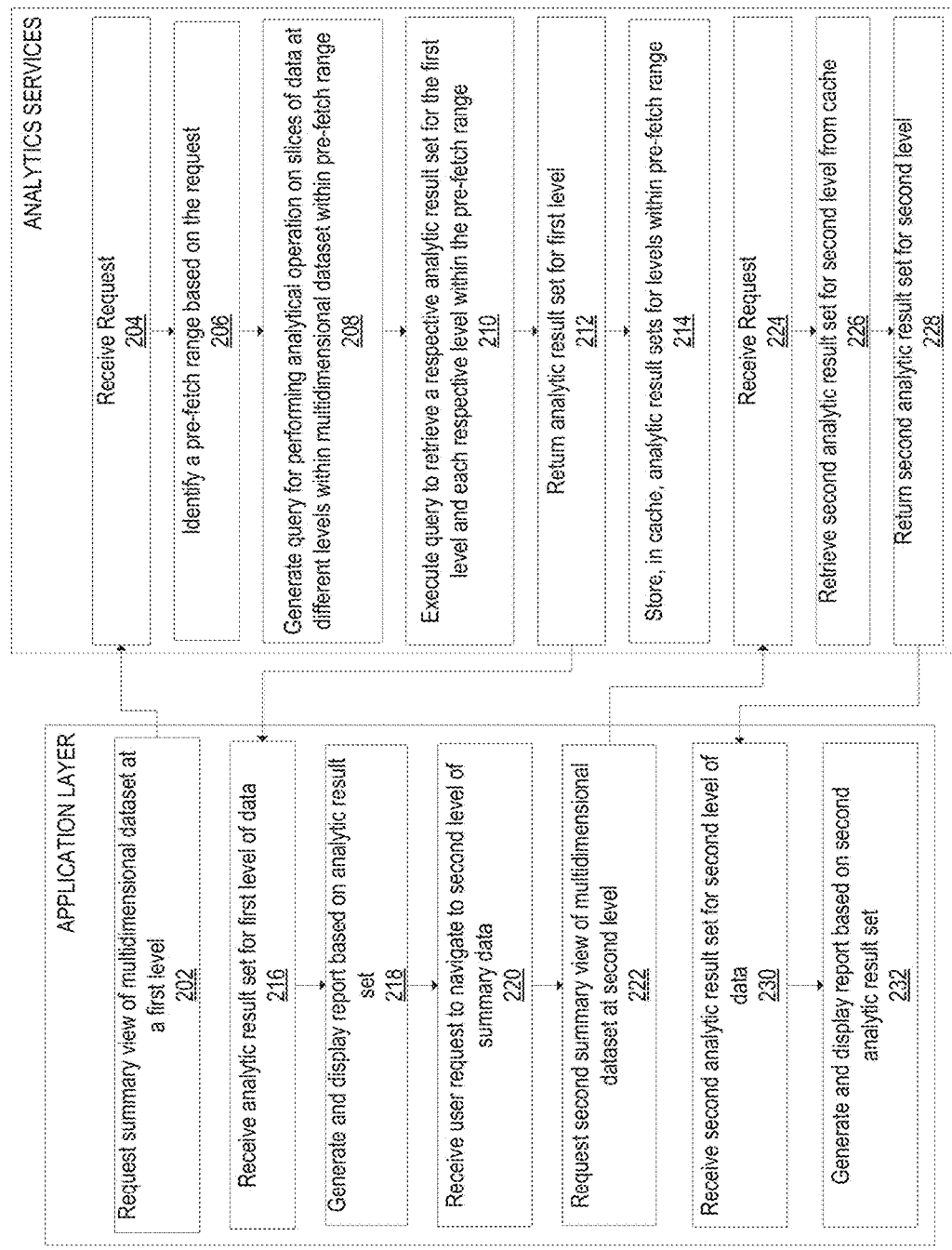
FIG. 2 depicts an example process for pre-fetching analytic results across different levels of data.

FIG. 2 illustrates an example process for pre-fetching analytic results across different levels of data. At step 202, the application layer generates a request to view a summary of one or more multidimensional datasets at a first level. The requested summary may vary depending on the particular implementation. In some embodiments, the request may comprise one or more query descriptors. Example summary views and query descriptors are provided in the sections above.

At step 204, query services 116 receives the request. The request may be received over network 150 or from an application that resides locally to the service.

At step 206, query services 116 identifies a pre-fetch range based on the request. In some embodiments, the pre-fetch range may be specified by the application. For example, the pre-fetch range may be embedded in the request or previously submitted by the analytical application. In other embodiments, a default pre-fetch range may be used. The default range may vary between different dimensions, cubes, and/or subjects. The application may further define the dimensions, hierarchies and drill-through path(s) to which the pre-fetch range applies and for which results should be pre-computed. In other embodiments, a default dimension, hierarchy and/or drill-through path may be selected.

At step 208, query services 116 generates a query for performing at least one analytical operation on slices of data at different levels within the multidimensional dataset that are within the pre-fetch range. As indicated above, the pre-fetch range may define how deep to fetch data along a particular drill-down and/or drill-up path. The database query that is generated at this step may include one or more SQL statements for performing the analytical operation for each combination of dimension attribute values that are within the pre-fetch range. In some embodiments, a single database query may be generated to perform the analytical operations across multiple operations. A single query may be executed to minimize the number of table scans across an OLAP cube, where a table may contain a relatively large number (e.g., a million or more) rows. In some cases, the aggregations may be performed in a single scan.

At step 210, the query is executed to retrieve a respective analytic result set for the first level of data and each respective level of data within the pre-fetch range. Executing the query may include generating a corresponding query execution plan, accessing values from the fact and dimension tables, and performing at least one aggregation for each different level of data within the pre-fetch range. In some embodiments, the analytic result set includes one or more aggregated values for each combination of dimension attribute values at the corresponding level of data or for a slice of the possible combinations at that level. As an example, an analytic result set may include total sales across different combinations of years, countries, and products at one level of data. If drilling down on the time dimension, the analytic result set may include total sales across different combinations of months, countries, and products for a second level of data. As another example, a slice may choose a single value for the country dimension attribute (e.g., U.S.) and aggregate different combinations of dimension attribute values for the month and product dimension attributes.

At step 212, query services 116 returns, to the application layer, a first analytic result set for the first level of data. In some embodiments, query services 116 may return analytic results for slices of data that belong to the first level of data and that are currently being viewed through the analytical application. Query services 116 may also store the first analytic result set in results cache 134 so that it may be fetched if the user navigates away from the current summary view and subsequently navigates back.

At step 214, query services 116 stores analytic result sets within the pre-fetch range in results cache 134. In addition or as an alternative to caching result sets within results cache 134, the analytic result sets may be cached at the application layer and/or by a browser. Thus, there may be multiple levels of caching from which pre-fetched analytic results may be accessed. The analytic result sets are cached even though they are not required results to satisfy the initial query and are not required to view the summary that was requested.

At step 216, the application layer receives the analytic result set for the first level of data. The result set may include results for the entire first level of data or for a particular slice of the first level of data. The result set may be received over network 150 or from a service of a data layer that resides locally.

At step 218, the application layer generates and displays report data based on the analytic result set. For example, the application layer may generate charts, graphs, or other GUI object data to represent the analytic result set. The GUI objects may be interactive to allow the user to drill through certain dimensions, navigate across cubes, and/or perform additional analytical operations.

At step 220, the application layer receives a user request to navigate to a second level of the summary data, where the second level of summary data is within the pre-fetch range. As an example, the user may click a particular dimension attribute value or otherwise interact with a GUI object to drill through to another level.

At step 222, the application layer requests a second summary view of the multidimensional dataset. In some embodiments, the application layer may send an updated query descriptor that targets the second level. As an example, in a drill down operation from year to month, the application layer may update a query descriptor to reflect the newly requested dimension level.

At step 224, query services 116 receives the request to return analytic results for the second summary view.

At step 226, query services 116 retrieves, from the cache, a second analytic result set for the second level of data. The second analytic result set may comprise analytic results for the each combination of dimension values within the second level of data or for a particular slice of the second level, depending on what is being currently viewed by the analytical application.

At step 228, query services 116 returns the second analytic result set for the second level. In some embodiments, the second analytic result set includes a different set of aggregated values than the first analytic result set. For example, the first analytic result set may comprise aggregates for each combination of dimension attribute values or a slice of dimension attribute values for a first set of dimension attributes that are associated with the first level, and the second analytic result set may comprise aggregates for each combination of dimension attributes values or a slice of dimension attribute values for a second set of dimension attributes that are associated with the second level.

At step 230, the application layer receives the second analytic result set for the second level of data from query services 116.

At step 232, the application layer generates and displays second report data for the second level of data based on the second analytic result set received at step 230. For example, the report may be updated to display analytic results for different combinations of categories as defined by the dimension attributes at the second level.

Figure 3:
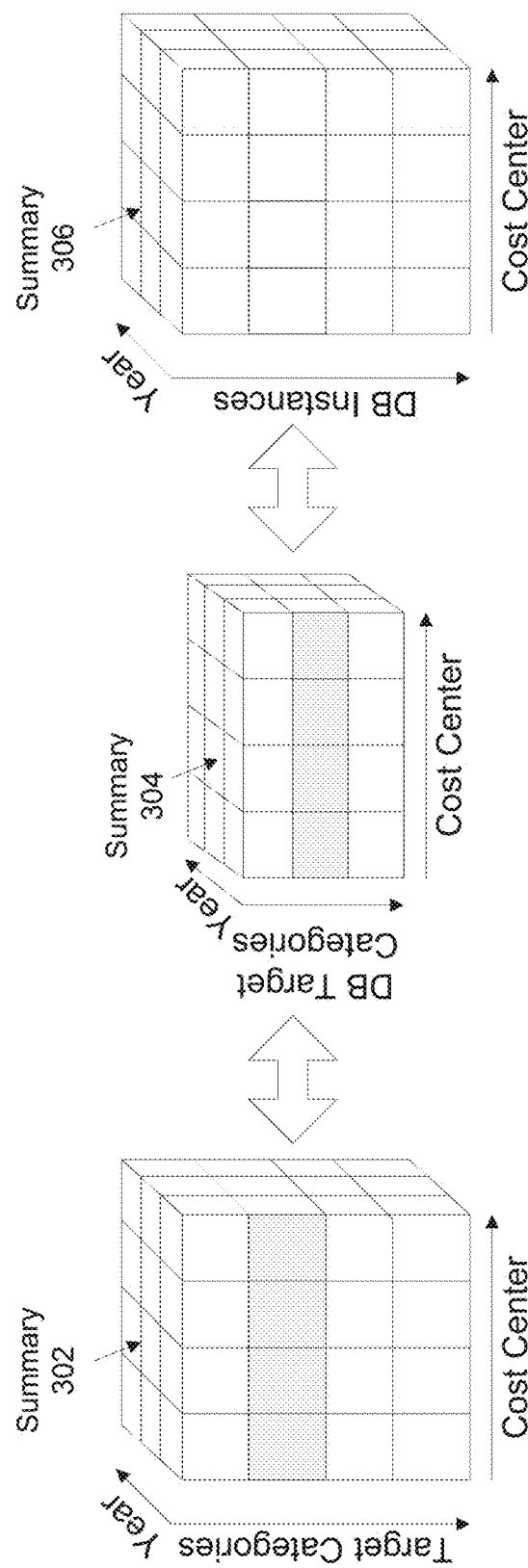
FIG. 3 depicts an example drill-through path for which analytic results may be pre-fetched.

FIG. 3 depicts an example drill-through path for which analytic results may be pre-fetched. Summary view 302 present a view of target performance across different combinations of target categories, years, and cost centers. In response to selecting the second row of summary view 302, where the second row represents "Database Targets", summary view 304 is presented to display database target performance across different combinations of database categories, years, and cost centers. Upon selecting a particular type of database, summary view 306 may be presented to indicate the performance of individual database instances. If the target dimension, represented by the 'y-axis' in summary views 302, 304, and 306, is associated with a pre-fetch range, then the analytic results for each of these views may be pre-fetched and cached. Caching the results may reduce the number of computationally expensive queries and table scans that are performed on underlying dimension and fact tables, which may significantly improve processing speeds during navigation and data analysis.

Top-N Analytic Precomputation Across Different Levels of Data

The techniques for pre-fetching data may be applied to top-n queries that target multidimensional datasets. Top-n queries include constraints for limiting the number of rows returned in a sorted set of data. The queries may be used when a user would like to return the top or bottom "n" number of data items at a particular level of data in a multidimensional dataset, where "n" represents a positive integer. As an example, a user may request the top five performing databases in the United States over the past year. In response to the query, a list of data records for the top five databases that satisfy the filter criteria (within the United States and in the past year) and ranked according to performance metrics (e.g., CPU performance, memory usage, etc.).

In the example above, the data items ranked are individual categories. A top-n query may also target specific categories, such as different dimension attributes or attribute values, for ranking. As an example, the top-n query may request the top-n selling regions for a product within the past quarter. In response, aggregations may be performed within each region, and each region may be ranked based on the aggregations. A list of the top-n regions may then be returned as a result for the query.

In some embodiments, a user may navigate through different levels to drill-through different top-n reports at different levels. Continuing with the previous example, for instance, a user may drill-down from region to city to view the top-n selling cities for the product in the past quarter. In some cases, the top-n cities may all be part of one or more of the top-n selling regions. In other cases, however, one or more of the top-n selling cities may be from a region not included in the top-n selling regions. Query services 116 may perform rollups on a dimension to account for such scenarios and to pre-fetch top-n results for different levels of a particular dimension in a multidimensional dataset.

In some embodiments, pre-fetching top-n result sets is performed based on a multilevel hierarchy associated with a particular dimension of a multidimensional dataset. Each level within the dimension hierarchy may be associated with a different key attribute value, and the ranking may be performed for data items that are associated with the key attribute at each level. In the above example, for instance, the top-level in the dimension hierarchy may be associated with country. Therefore, the top-n selling countries are ranked. At the next level, the key attribute may be states. Therefore, the top-n selling states may be ranked for this level. The next level may be associated with cities, regions, and so forth. During drill down from country to state, the top-n states are computed for the selected country. Similarly, for the city level, the top-n cities are computed for the selected country and selected state. In another example, a first level may return the top-n target software resources by CPU utilization. The second level may pre-fetch the top-n operating systems by CPU utilization, and the third level may pre-fetch the top-n operating system instances by CPU utilization. The top-n functions may also be computed during drill down operations.

In the above examples, the same ranking criteria were used for different levels in the dimension hierarchy. In other embodiments, different ranking criteria may be used for different levels. For example, the first level may return the top-n target software resources ranked by CPU utilization. The second level may pre-fetch the top-n operating systems ranked by operating system benchmarks ranked by memory usage. The key attributes and ranking criteria for each level may vary depending on the particular implementation. Each result set may be restricted to n number of data items, although the data items within each set may vary between different levels based on the key attributes, ranking criteria, and filters associated with each level.

In some embodiments, pre-fetching for a top-n query is restricted to a particular pre-fetch range such as described above for the pre-fetching of analytic results. Top-n result sets may thus be precomputed for key attributes that are associated with dimension levels within the pre-fetch range. By contrast, query services 116 does not precompute top-n results for dimension levels outside the pre-fetch range.

Figure 4:
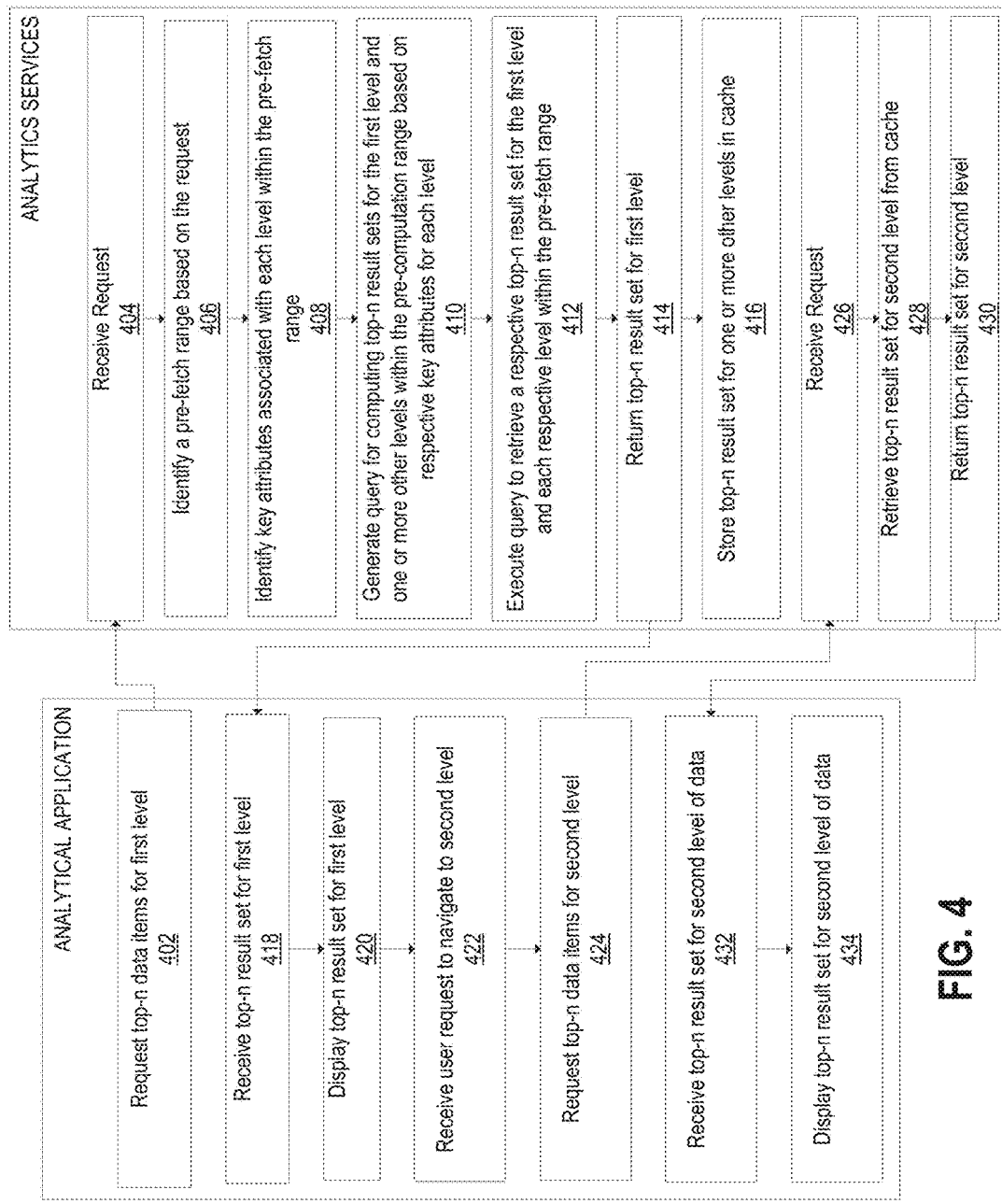
FIG. 4 depicts an example process for pre-fetching results across different levels of data for a top-n query.

FIG. 4 depicts an example process for pre-fetching results across different levels of data for a top-n query. At step 402, the application layer generates a request to view the top-n data items for a first level of a dimension that is associated with a multilevel hierarchy. The request may comprise one or more query descriptors that identify the relevant multi-dimensional dataset, target dimension, and/or number of levels to pre-fetch.

At step 404, query services 116 receives the request. The request may be received over network 150 or from an application that resides locally to the service.

At step 406, query services 116 identifies a pre-fetch range based on the request. In some embodiments, the pre-fetch range may be specified by the application. For example, the pre-fetch range may be embedded in the request or previously submitted by the analytical application. In other embodiments, a default pre-fetch range may be used. The default range may be determined based on a target dimension within the multidimensional dataset.

At step 408, query services 116 identifies key attributes associated with each level within the pre-fetch range. Each level may be associated with a different key attribute as previously described. The key attributes may correspond to different dimension attributes defined within the dimension hierarchy.

At step 410, query services 116 generates a query for computing top-n result sets for the first level of data and one or more other levels within the pre-computation range based on respective key attributes for each level. In some embodiments, multiple top-n result sets across different level may be computed using a single query. This reduces the number of computationally expensive table scans that are performed, thereby improving performance of the analytic computing system. Example top-n queries are provided in the section below.

At step 412, the query is executed to retrieve a respective top-n result set for the first level and each respective level within the pre-fetch range.

At step 414, query services 116 returns, to the application layer, a first top-n result set for the first level of data. Query services 116 may also store the top-n result set in results cache 134 so that it may be fetched if the user navigates away from the current view of top-n results and subsequently navigates back to the first level.

At step 416, query services 116 stores top-n result sets for one or more other levels within the pre-fetch range in results cache 134. In addition or as an alternative to caching result sets within results cache 134, the top-n result sets may be cached at the application layer and/or by a browser. Thus, there may be multiple levels of caching from which pre-fetched top-n results may be accessed.

At step 418, the application layer receives the top-n result set for the first level of data. The result set may include the top-n data items themselves or a list of the top n data items that satisfy the filter criteria. The data items or list may be sorted in order of ranking according to the ranking criteria. The result set may be received over network 150 or from a service of a data layer that resides locally.

At step 420, the application layer displays the top-n result set through a GUI. The GUI may be interactive to allow the user to drill through different top-n result sets at different levels in a hierarchy.

At step 422, the application layer receives a user request to navigate to a second level in the dimension hierarchy that is within the pre-fetch range. As an example, the user may click a particular dimension attribute value or otherwise interact with a GUI object to drill through to another level.

At step 424, the application layer requests the top-n data items for a second level. In some embodiments, the application layer may send an updated query descriptor that targets the second level. As an example, in a drill down operation from country to state, the application layer may update a query descriptor to reflect the newly requested dimension level.

At step 426, query services 116 receives the request to return the top-n data items for the second level.

At step 428, query services 116 retrieves, from the cache, a top-n result set for the second level of the dimension. The second top-n result set may comprise a different set of data items than the first top-n result set, although the data items may overlap. For example, the top-performing targets by CPU utilization may or may not overlap with the top performing databases by CPU utilization, depending on the performance metrics associated with each level.

At step 430, query services 116 returns the second top-n result set for the second level.

At step 432, the application layer receives the second top-n result set for the second level of data from query services 116.

At step 434, the application layer generates and displays second report data for the second level in the multilevel hierarchy based on the second result set. Thus, the user may navigate through different top-n lists that are pre-fetched based on a dimension hierarchy and its associated key attributes.

Query Generation for Top-N Analytic Precomputation

In some embodiments, top-n functions may be requested through one or more query descriptors. The query descriptors may combine the top-n operation with a rollup operation, such as depicted in TABLE 4 below.

TABLE 4

SAMPLE QUERY DESCRIPTOR WITH TOP-N AND ROLLUP

```
{
    "subject":"WEBLOGIC",
    "cube":"WEBLOGIC_MEMUSAGE_CUBE1",
    "source":{
        "type":"cube",
        "cube":" WEBLOGIC_MEMUSAGE_CUBE1"
    },
    "aggregationList": [
        {
            "alias":"Avg_Memory_Heap_Memory_",
            "type":"measureAggregation",
            "function":"Average",
            "functionParameters":[
            ],
            "measure":"HEAPMEMORYUSEDVALUE"
        },
        {
            "type":"aggregationAggregation",
            "function":"Trunc with format",
            "alias":"time_nk",
            "functionParameters":[      "'hh'"          ],
            "treatAsMeasure":false,
            "aggregation":{
                "type":"dateAggregation",
                    "function":"Minimum",
                    "functionParameters":[          ],
                    "cube":" WEBLOGIC_MEMUSAGE_CUBE1 ",
                    "dimension":"TIME"
            }
        }
    ],
    "selectionList":[
```

TABLE 4-continued

SAMPLE QUERY DESCRIPTOR WITH TOP-N AND ROLLUP

```
    ],
    "grpbyEntityList":[
        {
            "type":"grpbyLevel",
            "withRollup":false,
            "level":{
                "name":"TIMELEVELMONTHOFYEAR",
                "hierarchy":"TIMEHIERBYMONTHOFYEAR",
                "dimension":"TIME"
            }
        }
    ],
    "rollupLowestLevels":[
        {
            "name":"TARGETLEVELINSTANCE",
            "hierarchy":"TARGETHIERBYTYPE",
            "dimension":"WEBLOGIC_PROPS"
        }
    ],
    "startingRollupLevels":[
        {
            "name":"TARGETLEVELTYPE",
            "hierarchy":"TARGETHIERBYTYPE",
            "dimension":"WEBLOGIC_PROPS"
        }
    ],
    "whereExpression":{
        "conjunction":"AND",
        "filterList":[
            {
                "type":"relative_time_range",
                "isLast":true,
                "offset":1,
                "offsetField":1,
                "dimension":"TIME"
            }
        ]
    },
    "parameters":{
    },
    "dynHierList":[
    ],
    "hasDynHier":false,
    "topnConfig":{
        "analysisType":"ANALYSIS_TOPN",
        "topnAggFunction":"MAX_AGG",
        "sortAscending":false,
        "topnValue":2,
        "measureAgg":{
            "alias":"Avg_Memory_Heap_Memory_",
            "type":"measureAggregation",
            "function":"Average",
            "functionParameters":[
            ],
            "measure":"HEAPMEMORYUSEDVALUE"
        },
        "rankbyAttr":{
            "type":"attributeSelection",
            "attribute":{
                "name":"DISPLAYNAME",
                "dimension":"WEBLOGIC_PROPS"
            }
        },
        "rankbyAttrLevel":{
            "name":"TARGETLEVELINSTANCE",
            "dimension":"WEBLOGIC_PROPS",
            "hierarchy":"TARGETHIERBYTYPE"
        }
    },
    "identity":"-1963144146"
}
```

The query descriptor in TABLE 4 retrieves top-n target records that are ranked and ordered by average heap memory usage. Results are pre-fetched across different levels of the target dimension.

As previously indicated, query services 116 may translate a request to perform a top-n analysis across different levels into a single database query. In some cases, the database query may be executed the top-n result sets for the different levels may be computed using a scan of the targeted tables. An example SQL statement is provided below that ranks different levels of targets by average memory usage ("AVGACTIVEMEMORY").

TABLE 5

SAMPLE SQL WITH TOP-N AND ROLLUP

```
SELECT MAX (RANK)            AS "RANK",
    SUM(AVGACTIVEMEMORY)     AS "TOP_N_MA",
    TARGET_COSTCENTER,
    TARGET_MEID,
    START_TIME_YEAROFERA,
    START_TIME_MONTHOFYEAR,
    MAX (TARGET_DISPLAYNAME)              AS TARGET_DISPLAYNAME,
    MIN(EMWC_TVMDWFLOAD_START_TIME_ID)    AS EMWC_TVMDWFLOAD_START_TIME_ID,
    MIN(TOPN_AGG_PERDIMATTRIB)            AS "RANKED_ON_MA_VAL",
    COUNT(*)                              AS "TOP_N_GROUP_SIZE"
FROM
    (SELECT
      CASE
        WHEN RNK_PER_DIMATTRIB <= 1
        THEN RNK_PER_DIMATTRIB
        ELSE NULL
      END RANK,
      CASE
        WHEN rankbyAttr1_grpL1 = 0
        THEN
          CASE
            WHEN RNK_PER_DIMATTRIB <= 1
            THEN TARGET_MEID
            ELSE 'OTHERS'
          END
        ELSE TARGET_MEID
      END AS TARGET_MEID,
      CASE
        WHEN rankbyAttr1_grpL1 = 0
        THEN
          CASE
            WHEN RNK_PER_DIMATTRIB <= 1
            THEN TARGET_DISPLAYNAME
            ELSE 'OTHERS'
          END
        ELSE TARGET_DISPLAYNAME
      END AS TARGET_DISPLAYNAME,
      CASE
        WHEN rankbyAttr1_grpL2 = 0
        AND rankbyAttr1_grpL1 ! = 0
        THEN
          CASE
            WHEN RNK_PER_DIMATTRIB <= 1
            THEN TARGET_COSTCENTER
            ELSE 'OTHERS'
          END
        ELSE TARGET_COSTCENTER
      END AS TARGET_COSTCENTER,
      START_TIME_YEAROFERA,
      START_TIME_MONTHOFYEAR,
      AVGACTIVEMEMORY,
      EMWC_TVMDWFLOAD_START_TIME_ID,
      TOPN_AGG_PERDIMATTRIB
    FROM
      (SELECT TARGET_COSTCENTER,
        TARGET_MEID,
        TARGET_DISPLAYNAME,
        START_TIME_YEAROFERA,
        START_TIME_MONTHOFYEAR,
        AVGACTIVEMEMORY,
        EMWC_TVMDWFLOAD_START_TIME_ID,
        CASE
          WHEN rankbyAttr1_grpL1 = 0
          THEN DENSE_RANK( ) OVER (PARTITION BY TARGET_COSTCENTER, rankbyLevel1_gpid ORDER BY TOPN_AGG_PERDIMATTRIB ASC)
          WHEN rankbyAttr1_grpL2 = 0
          AND rankbyAttr1_grpL1 ! = 0
          THEN DENSE_RANK( ) OVER (PARTITION BY rankbyLevel2_gpid ORDER BY TOPN_AGG_PERDIMATTRIB ASC)
          ELSE DENSE_RANK( ) OVER (PARTITION BY TARGET_COSTCENTER ORDER BY TOPN_AGG_PERDIMATTRIB ASC)
        END AS RNK_PER_DIMATTRIB,
```

TABLE 5-continued

SAMPLE SQL WITH TOP-N AND ROLLUP

```
    TOPN_AGG_PERDIMATTRIB ,
    rankbyAttr1_grpL1,
    rankbyAttr1_grpL2 ,
    rankbyLevel1_gpid,
    rankbyLevel2_gpid
  FROM
   (SELECT TARGET_COSTCENTER,
     TARGET_MEID,
     TARGET_DISPLAYNAME,
     START_TIME_YEAROFERA,
     START_TIME_MONTHOFYEAR,
     AVGACTIVEMEMORY,
     EMWC_TVMDWFLOAD_START_TIME_ID,
     CASE
       WHEN rankbyAttr1_grpL1 = 0
       THEN MAX(AVGACTIVEMEMORY) OVER (PARTITION BY TARGET_COSTCENTER,
TARGET_MEID)
       WHEN rankbyAttr1_grpL2 = 0
       AND rankbyAttr1_grpL1 ! = 0
       THEN MAX(AVGACTIVEMEMORY) OVER (PARTITION BY TARGET_COSTCENTER)
       ELSE MAX(AVGACTIVEMEMORY) OVER (PARTITION BY TARGET_COSTCENTER)
     END AS TOPN_AGG_PERDIMATTRIB ,
     rankbyAttr1_grpL1,
     rankbyAttr1_grpL2 ,
     rankbyLevel1_gpid,
     rankbyLevel2_gpid
    FROM
     (SELECT AVG(EMWC_TVMDWFLOAD.ACTIVE_MEMORY)    AS "AVGACTIVEMEMORY",
       GROUPING(START_TIME.MONTHOFYEAR)            AS hier2attr_2_grp,
       GROUPING(START_TIME.YEAROFERA)              AS hier2attr_1_grp,
       GROUPING(TARGET.COSTCENTER)                 AS rankbyAttr1_grpL2,
       GROUPING(TARGET.MEID)                       AS rankbyAttr1_grpL1,
       GROUPING_ID(START_TIME.YEAROFERA,START_TIME.MONTHOFYEAR),
       GROUPING_ID(TARGET.COSTCENTER,TARGET.MEID)  AS rankbyLevel2_gpid,
       GROUPING_ID(TARGET.MEID)                    AS rankbyLevel1_gpid,
       MAX(TARGET.DISPLAYNAME)                     AS TARGET_DISPLAYNAME,
       START_TIME.MONTHOFYEAR                      AS
START_START_TIME_TIME_MONTHOFYEAR,
       START_TIME.YEAROFERA                        AS START_TIME_YEAROFERA,
       TARGET.COSTCENTER                           AS TARGET_COSTCENTER,
       TARGET.MEID                                 AS TARGET_MEID,
       TRUNC(MIN(START_TIME.TIME_ID), 'MM')        AS
"EMWC_TVMDWFLOAD_START_TIME_ID",
       GROUP_ID( )                                 AS GROUP_ID
      FROM EMWC_TVMDWFLOAD
      INNER JOIN EMWD_TARGET TARGET
      ON EMWC_TVMDWFLOAD.TARGET_ID = TARGET.TARGET_ID
      RIGHT JOIN EMWD_TIME START_TIME
      ON EMWC_TVMDWFLOAD.START_TIME_ID = START_TIME.TIME_ID
      WHERE ((to_date(START_TIME.YEAROFERA
         ||'-'
         ||START_TIME.MONTHOFYEAR,'yyyy-mm') >= to_date('2014-01-01
00:00:00', 'yyyy-MM-dd HH24:MI:SS')
      AND to_date(START_TIME.YEAROFERA
         ||'-'
         ||START_TIME.MONTHOFYEAR,'yyyy-mm') <= to_date('2014-03-01
0 00:00:00', 'yyyy-MM-dd HH24:MI:SS')))
      GROUP BY ROLLUP(TARGET.COSTCENTER,TARGET.MEID),
       ROLLUP(START_TIME.YEAROFERA,START_TIME.MONTHOFYEAR)
      HAVING ((GROUP_ID( ) = 0))
     )
    )
   )
  )
GROUP BY TARGET_COSTCENTER,
  TARGET_MEID ,
  START_TIME_YEAROFERA,
  START_TIME_MONTHOFYEAR
```

Custom Hierarchies

In some embodiments, an application may select the hierarchy to use when pre-fetching analytic results. For a particular dimension of a multidimensional dataset, there may be multiple hierarchies. As an example, two or more attributes may be at the same level in the hierarchy. There may be multiple possible drill down paths between a first level and a second level. The analytic application may define and store a custom hierarchy in a query descriptor. Query services 116 uses the defined hierarchy to determine the levels for which pre-fetching applies and to generate and execute the corresponding database query.

In some embodiments, a selected hierarchy may be predefined by metadata residing in metadata store 132. The predefined hierarchies may be generated, for example, during the extraction, transform, load process applied to the target data. Metadata services 114 may send a metadata descriptor to identify the hierarchies associated with a particular dimension. For example, the metadata may identify which dimension attributes belong to the hierarchy, the level associated with each dimension attribute, and the relationship between dimension attributes in the hierarchy. Analytic applications 112 may extract relevant information from the metadata descriptor and include the extracted metadata in a query descriptor for the selected hierarchy.

In some embodiments, a selected hierarchy may be custom defined by an application or other user. The custom definition may stitch together a dimension hierarchy using dimension attributes of interest from different levels. As an example, a particular dimension may group dimension attributes into four different levels, where each level is associated with one or more respective attributes. The custom hierarchy may select a dimension attribute from each level, or one or more levels may be omitted.

A custom hierarchy defines custom drill-through and rollup paths, which may be leveraged during the pre-fetch operations described above. As an example, a location dimension may have dimension attributes corresponding to country, state, region, and city. Each of the aforementioned dimension attributes may be at a different level for the location dimension. However, a user may not be interested in the region dimension. The custom hierarchy may stitch together the dimension attributes from three of the four levels to form a drill down path from country to state to city. Another application may form a different drill down path directly from country to city or some other combination of the dimension attributes. During pre-fetch operations, the levels for which analytic results are pre-computed and cached is determined based on the pre-fetch range and the custom hierarchy. If the custom hierarchy is country-state-city, and then analytic results for country and state but not city may be pre-fetched depending on the pre-fetch range. With the same pre-fetch range, analytic results for country and city may be pre-fetched for the custom hierarchy country-city. Thus, custom hierarchies provide analytical applications and users great flexibility when analyzing multidimensional datasets.

Cache Misses

In some cases, a user may drill down to a level of data for which there are no pre-fetched results. For example, a user may navigate to a level of data that is out of the pre-fetch range. As another example, an analytic result may be invalidated if the underlying data changes. In these scenarios, the analytic result for the current level of data may be computed on request.

In some embodiments, analytic results are pre-fetched for the current level and one or more other levels within the pre-fetch range. For example, an initial pre-fetch range may specify that analytic results are to be cached for two levels below the currently viewed level along a particular dimension. If the user drills down two levels along the dimension, the analytic results may be fetched from the cache. If the user drills down one additional level along the dimension or on a different dimension, the analytic results may not be cached since they correspond to a level outside the pre-fetch range. In such an event, an additional two levels below the currently viewed level may be pre-fetched. Thus, the initial pre-fetched set of analytic results may, in effect, be extended. This may reduce computing overhead if, once a user has navigated outside the pre-fetch range, the user is likely to continue drilling down.

In other embodiments, if a currently viewed level is outside the initial pre-fetch range, then the analytic result set is computed for the currently viewed level but not for other levels. This implementation may be more efficient if navigation past the pre-fetched levels is extremely rare.

Analytical Query Caching Based on Query Descriptors

In some embodiments, the analytical parts of a query descriptor, or set of query descriptors (referred to herein as a "query descriptor group") may be separated into analytical parts and cached separately. Each analytical part of the query descriptor may map to a different SQL statement or other database query that is executed to produce. The analytical parts may be cached separately such that cached query descriptor requests are not re-executed to produce the same database query. Separate query descriptors that produce the same database queries access the same cached data.

In some embodiments, mapping data is maintained that maps requests and sub-requests to a corresponding database queries. As an example a request may be uniquely identified by a requestId that is sent back as a token to a user interface. The requestId may comprise an alphanumeric sequence or other identification data that can be used by the client to track the status of execution of the request. Query services 116 may execute the request in a pipelined manner, where each request is broken down in to sub requests and every sub request is carried out by a separate worker thread in the data warehouse.

In some cases, a request may be a single query descriptor. In this case, the requestId corresponds to the SQLID generated as a hash of the SQL statement that is produced by the query descriptor. By maintaining a mapping between the SQLID and SQL statement, query services 116 may reuse SQL statements re-execute a query descriptor request which produces the same SQL statement, but may result in different GUI configurations and displays.

In the case of a query descriptor group, different sub-requests within the group may be processed and separated for caching. As an example a forecast request may be uniquely identified by the following:
- The query on which the forecasting will be done.
- The algorithm specific parameters the determine the forecast results (Regression Model, forecast period, confidence interval percentage, Minimum value, maximum value)

This information may be passed through a set of "parameters" inside the query descriptor group. The execution engine of query services 116 knows where to look for and get the parameters out of the query descriptor group. Using all this information along with the SQLID generated by the query descriptor, query services 116 may generate the requestId. In an internal registry, query services 116 may store all the information that is used to produce the requestId. As an example, the information may be stored in a data object in a particular format, such as in a JavaScript Object Notation (JSON) or XML, format. The data object may be used for generating the hash that corresponds to the requestId. The next time the a request comes in with a query descriptor that produced the same SQL and has the same forecast configuration information, query services 116 generates the data object again and checks if the requestId generated for the data object already exists in the cache. By this way, query services 116 may avoid redoing a forecast request that already has results. An example data object is depicted in TABLE 6 below.

TABLE 6

SAMPLE JSON CLOB FOR GENERATING REQUEST ID

```
{
        "forecastQdIdentity":"1435902578",
        "selectedRegressionModel":"LINEAR",
        "forecastPeriod":3,
        "confidence":0.95,
        "forecastQd":{
                "sqlId":"7vjn5mgtdrt0n",
                "timeColName":"TIME_NK",
                "measureColNames":["AVG(DISKREADWRITE)",
                "AVG(ACTIVEWRITES)"],
                "measureDisplayNames":["DiskReadWrite",
                "ActiveWrites"],
                "minValues":[0,0],
                "maxValues":[1.0E100,1.0E100]
                }
}
```

The data object depicted in TABLE 6 includes the various parameters for a forecast operation. These parameters are store in a JSON character large object (CLOB), which may be processed by a hash function to generate a corresponding requestID.

Prefetching Other Dimension Calculation Result Sets

The techniques for pre-fetching top-n result sets may be extended to other dimension calculations and analytical functions. Examples include, without limitation, bottom-n functions that return the bottom ranked items, functions that rank items based on aggregate functions, ntile functions that divide items into groups based on percentiles, and distance functions that compute the position of an item with respect to another item based on a measure. Accordingly, the functions that are pre-computed and pre-fetched may vary from implementation to implementation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
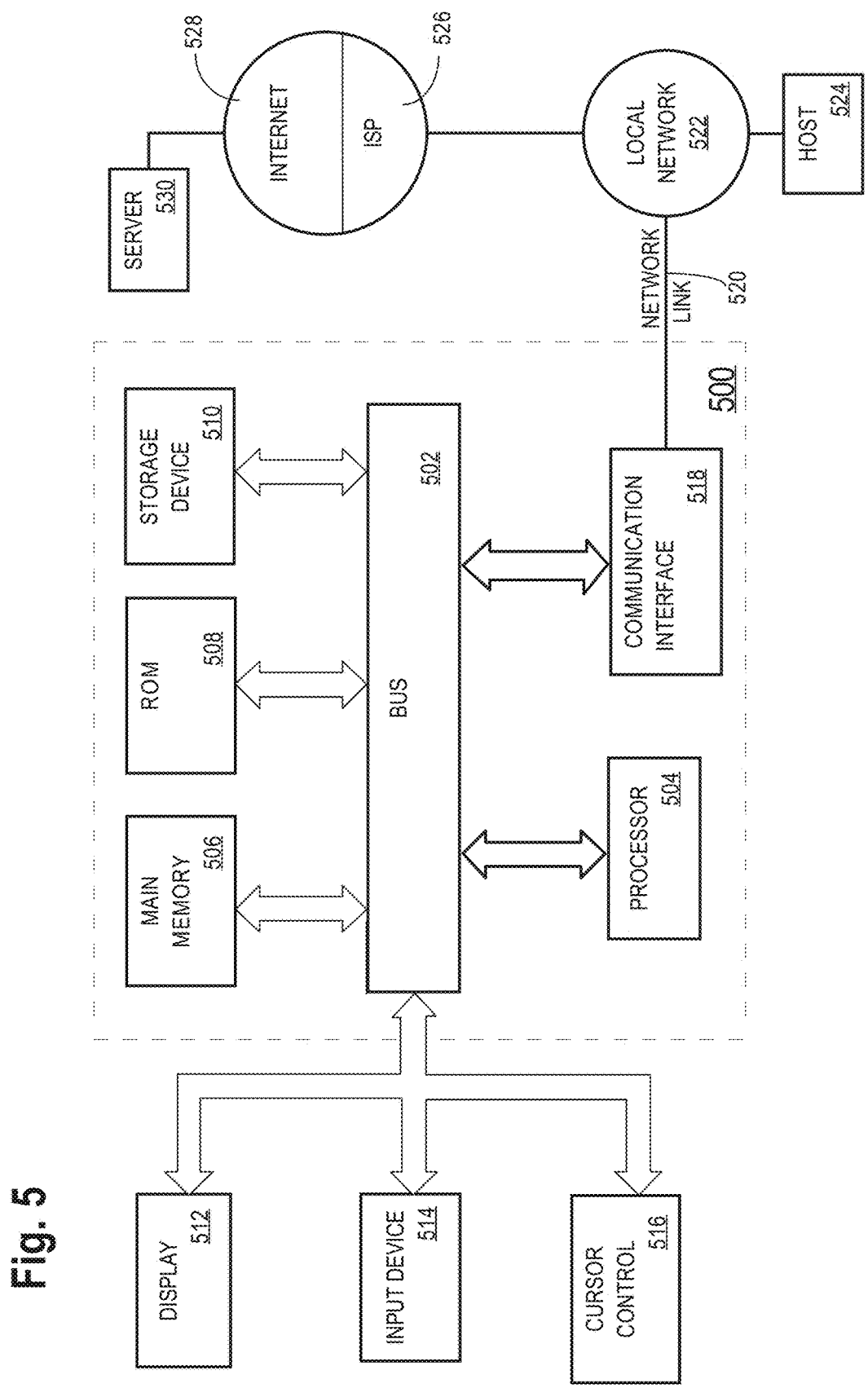
FIG. 5 depicts an example computer system upon which some embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details and embodiments that are combinable in different ways and that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
 receiving from an application layer, a first request to view a summary of a multidimensional dataset;
 wherein the first request to view the summary of the multidimensional data set targets a first level of a particular dimension in the multidimensional dataset;
 in response to receiving the first request to view the summary of the multidimensional dataset:
  determining a pre-fetch range that identifies how many levels of analytic results to pre-fetch along the particular dimension of the multidimensional dataset;
  performing, for the first level of the particular dimension and one or more levels that are within the pre-fetch range of the first level of the particular dimension, at least one analytical operation;
  returning, to the application layer, a first analytic result of the at least one analytical operation for the first level of the particular dimension; and
  storing, in a cache, a respective analytic result of the at least one analytical operation for each respective level of the one or more levels;
 wherein the respective analytic result of the at least one analytical operation for each respective level of the one or more levels is not required to view the summary of the multidimensional dataset;
 receiving a second request to navigate to a second level of the particular dimension that is within the pre-fetch range of the first level of the particular dimension;
 in response to receiving the second request:
  retrieving, from the cache, a second analytical result of the at least one analytical operation for the second level of the particular dimension; and
  returning, to the application layer, the second analytical result of the at least one analytical operation for the second level of the particular dimension.
2. The method of claim 1, further comprising:
 receiving, from the application layer, a third request to navigate to a third level of the particular dimension;
 wherein the third level of the particular dimension is outside the pre-fetch range of the first level of the particular dimension;
 in response to receiving the third request to navigate to the third level of the particular dimension:
  performing, for the third level of the particular dimension and a second set of one or more levels that are within the pre-fetch range of the third level of the particular dimension, the at least one analytical operation;
  returning, to the application layer, a third analytic result of the at least one analytical operation for the third level of the particular dimension;
  storing, in a cache, a respective analytic result of the at least one analytical operation for each respective level of the second set of one or more levels.
3. The method of claim 1, wherein the first request from the application layer identifies the pre-fetch range.
4. The method of claim 1, wherein the pre-fetch range is a default number of levels that is associated with the particular dimension.

5. The method of claim 1, wherein the first request to view the summary of the multidimensional dataset comprises one or more query descriptors; the method further comprising:
generating a set of one or more structure query language (SQL) statements for performing the at least one analytical operation based on the one or more query descriptors.

6. The method of claim 5, further comprising:
determining, based on the one or more query descriptors, a set of analytical parts for performing the at least one analytical operation;
for each respective analytical part in the set of analytical parts, storing, in the cache, a respective SQL statement;
in response to receiving a third request that includes a particular query descriptor that has an analytical part that maps to at least one SQL statement stored in the cache, reusing the at least one SQL statement stored in the cache to generate a query result for the third request.

7. The method of claim 1, wherein the levels for the particular dimension are determined based on a hierarchy of dimension attributes for the particular dimension.

8. The method of claim 7, further comprising:
receiving, from the application layer, custom hierarchy information that defines the hierarchy of dimension attributes that is associated with the particular dimension.

9. The method of claim 1, wherein the at least one analytic operation includes performing an aggregation for each level of the one or more levels.

10. The method of claim 1, wherein the respective analytic result of the at least one analytical operation for each respective level of the one or more levels is not initially requested by the first request to view the summary of the multidimensional dataset.

11. One or more non-transitory computer-readable media storing instructions which, when executed by one or more processors, cause operations comprising:
receiving, from an application layer, a first request to view a summary of a multidimensional dataset;
wherein the first request to view the summary of the multidimensional dataset targets a first level of a particular dimension in the multidimensional dataset;
in response to receiving the first request to view the summary of the multidimensional data set:
determining a pre-fetch range that identifies how many levels of analytic results to pre-fetch along the particular dimension of the multidimensional dataset;
performing, for the first level of the particular dimension and one or more levels that are within the pre-fetch range of the first level of the particular dimension, at least one analytical operation;
returning, to the application layer, a first analytic result of the at least one analytical operation for the first level of the particular dimension; and
storing, in a cache, a respective analytic result of the at least one analytical operation for each respective level of the one or more levels; wherein the respective analytic result of the at least one analytical operation for each respective level of the one or more levels is not required to view the summary of the multidimensional dataset;
receiving a second request to navigate to a second level of the particular dimension that is within the pre-fetch range of the first level of the particular dimension;
in response to receiving the second request:
retrieving, from the cache, a second analytical result of the at least one analytical operation for the second level of the particular dimension; and
returning, to the application layer, the second analytical result of the at least one analytical operation for the second level of the particular dimension.

12. The one or more non-transitory computer-readable media of claim 11, wherein the instructions further cause operations comprising:
receiving, from the application layer, a third request to navigate to a third level of the particular dimension;
wherein the third level of the particular dimension is outside the pre-fetch range of the first level of the particular dimension;
in response to receiving the third request to navigate, to the third level of the particular dimension:
performing, for the third level of the particular dimension and a second set of one or more levels that are within the pre-fetch range of the third level of the particular dimension, the at least one analytical operation;
returning, to the application layer, a third analytic result of the at least one analytical operation for the third level of the particular dimension;
storing, in a cache, a respective analytic result of the at least one analytical operation for each respective level of the second set of one or more levels.

13. The one or more non-transitory computer-readable media of claim 11, wherein the first request from the application layer identifies the pre-fetch range.

14. The one or more non-transitory computer-readable media of claim 11, wherein the pre-fetch range is a default number of levels that is associated with the particular dimension.

15. The one or more non-transitory computer-readable media of claim 11, wherein the first request to view the summary of the multidimensional dataset comprises one or more query descriptors; the instructions further causing operations comprising:
generating a set of one or more structure query language (SQL) statements for performing the at least one analytical operation based on the one or more query descriptors.

16. The one or more non-transitory computer-readable media of claim 15, wherein the instructions further cause operations comprising:
determining, based on the one or more query descriptors, a set of analytical parts for performing the at least one analytical operation;
for each respective analytical part in the set of analytical parts, storing, in the cache, a respective SQL statement;
in response to receiving a third request that includes a particular query descriptor that has an analytical part that maps to at least one SQL statement stored in the cache, reusing the at least one SQL statement stored in the cache to generate a query result for the third request.

17. The one or more non-transitory computer-readable media of claim 11, wherein the levels for the particular dimension are determined based on a hierarchy of dimension attributes for the particular dimension.

18. The one or more non-transitory computer-readable media of claim 17, wherein the instructions further cause operations comprising:

receiving, from the application layer, custom hierarchy information that defines the hierarchy of dimension attributes that is associated with the particular dimension.

19. The one or more non-transitory computer-readable media of claim 11, wherein the at least one analytic operation includes performing an aggregation for each level of the one or more levels.

20. The one or more non-transitory computer-readable media of claim 11, wherein the respective analytic result of the at least one analytical operation for each respective level of the one or more levels is not initially requested by the first request to view the summary of the multidimensional dataset.

21. A system comprising:
one or more hardware processors;
one or more non-transitory computer-readable media storing instructions which, when executed by the one or more hardware processors, cause operations comprising:
receiving, from an application layer, a first request to view a summary of a multidimensional dataset;
wherein the first request to view the summary of the multidimensional dataset targets a first level of a particular dimension in the multidimensional dataset;
in response to receiving the first request to view the summary of the multidimensional dataset:
determining a pre-fetch range that identifies how many levels of analytic results to pre-fetch along the particular dimension of the multidimensional dataset;
performing, for the first level of the particular dimension and one or more levels that are within the pre-fetch range of the first level of the particular dimension, at least one analytical operation;
returning, to the application layer, a first analytic result of the at least one analytical operation for the first level of the particular dimension; and
storing, in a cache, a respective analytic result of the at least one analytical operation for each respective level of the one or more levels;
wherein the respective analytic result of the at least one analytical operation for each respective level of the one or more levels is not required to view the summary of the multidimensional dataset;
receiving a second request to navigate to a second level of the particular dimension that is within the pre-fetch range of the first level of the particular dimension;
in response to receiving the second request:
retrieving, from the cache, a second analytical result of the at least one analytical operation for the second level of the particular dimension; and
returning, to the application layer, the second analytical result of the at least one analytical operation for the second level of the particular dimension.

22. The system of claim 21, wherein the first request from the application layer identifies the pre-fetch range.

* * * * *

UNITED STATES PATENT AND TRADEMARK OFFICE
CERTIFICATE OF CORRECTION

PATENT NO. : 10,191,963 B2
APPLICATION NO. : 15/057053
DATED : January 29, 2019
INVENTOR(S) : Shen et al.

Page 1 of 1

It is certified that error appears in the above-identified patent and that said Letters Patent is hereby corrected as shown below:

In the Specification

In Column 22, Line 54, delete "value)" and insert -- value). --, therefor.

In Column 22, Line 65, delete "XML," and insert -- XML --, therefor.

In Column 22, Line 67, delete "the a" and insert -- the --, therefor.

In the Claims

In Column 26, Line 10, in Claim 1, delete "receiving" and insert -- receiving, --, therefor.

In Column 26, Line 13, in Claim 1, delete "data set" and insert -- dataset --, therefor.

In Column 26, Line 17, in Claim 1, delete "identities" and insert -- identifies --, therefor.

In Column 27, Line 47, in Claim 11, delete "data set:" and insert -- dataset: --, therefor.

In Column 28, Line 16, in Claim 12, delete "navigate," and insert -- navigate --, therefor.

Signed and Sealed this
Fourth Day of February, 2020

Andrei Iancu
*Director of the United States Patent and Trademark Office*